United States Patent [19]
Kohno

[11] Patent Number: 5,455,714
[45] Date of Patent: Oct. 3, 1995

[54] ZOOM LENS SYSTEM

[75] Inventor: Tetsuo Kohno, Toyonaka, Japan

[73] Assignee: Minolta Co. Ltd., Osaka, Japan

[21] Appl. No.: 113,609

[22] Filed: Aug. 27, 1993

[30] Foreign Application Priority Data

Sep. 1, 1992 [JP] Japan .................................. 4-233592

[51] Int. Cl.$^6$ ............................ G02B 15/14; G02B 13/18
[52] U.S. Cl. ............................................. 359/689; 359/713
[58] Field of Search .................................... 359/689, 713

[56] References Cited

U.S. PATENT DOCUMENTS

| 3,286,592 | 11/1966 | Wagner et al. | 359/689 |
| 4,909,613 | 3/1990 | Kikichi | 359/692 |
| 4,936,661 | 6/1990 | Betensky et al. | 359/691 |
| 4,938,572 | 7/1990 | Iwasaki | 359/689 |
| 4,955,700 | 9/1990 | Yamaguchi | 359/689 |
| 5,175,648 | 12/1992 | Mori | 359/689 |
| 5,253,114 | 10/1993 | Lee et al. | 359/689 |

FOREIGN PATENT DOCUMENTS

| 2201409 | 8/1990 | Japan . |
| 3265811 | 11/1991 | Japan . |
| 4123014 | 4/1992 | Japan . |

Primary Examiner—Scott J. Sugarman
Attorney, Agent, or Firm—Price, Gess & Ubell

[57] ABSTRACT

A zoom lens system comprises from the object side to the image side a negative first lens unit, a positive second lens unit, and a negative third lens unit. The negative first lens unit consists of a negative lens element and a positive lens element. The positive second lens unit consists of a negative lens element and a positive lens element, and has a first air space between the first and second lens units. The negative third lens unit consists of a positive lens element and a negative lens element, and has a second air space between the second and third lens units. All the lens units shift along an optical axis of the zoom lens system during a zooming operation from the shortest focal length condition to the longest focal length condition with decreasing the first and second air spaces.

16 Claims, 8 Drawing Sheets

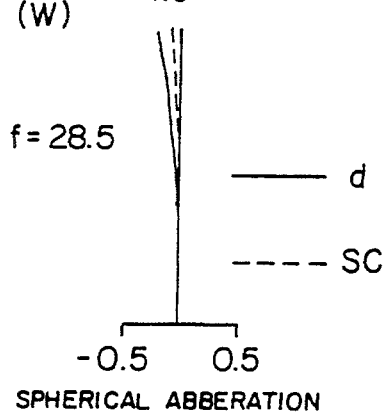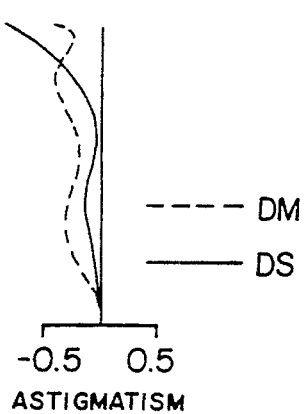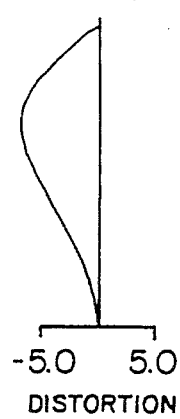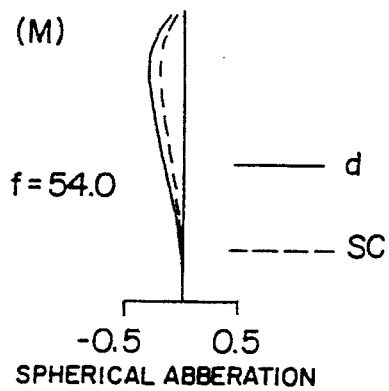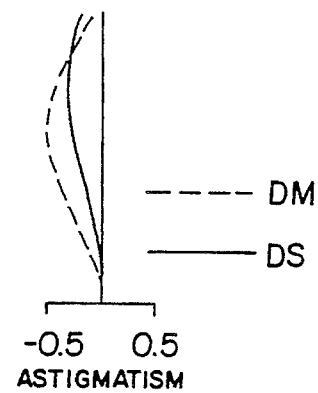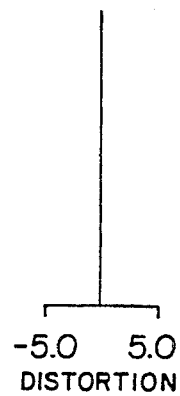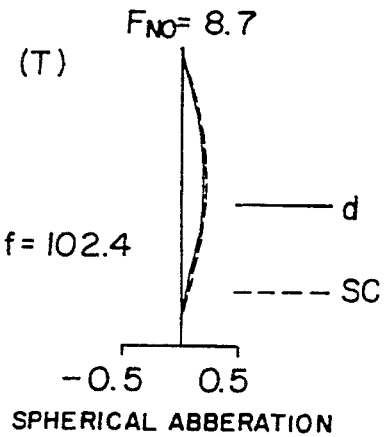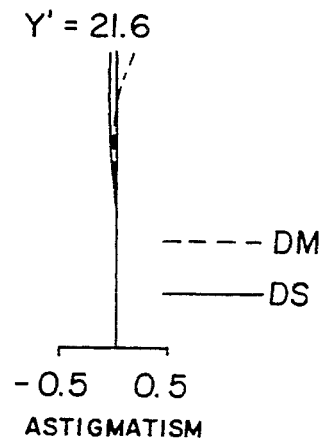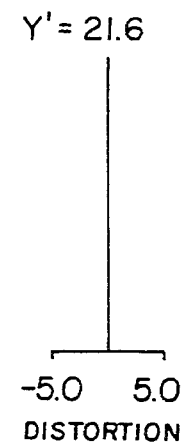

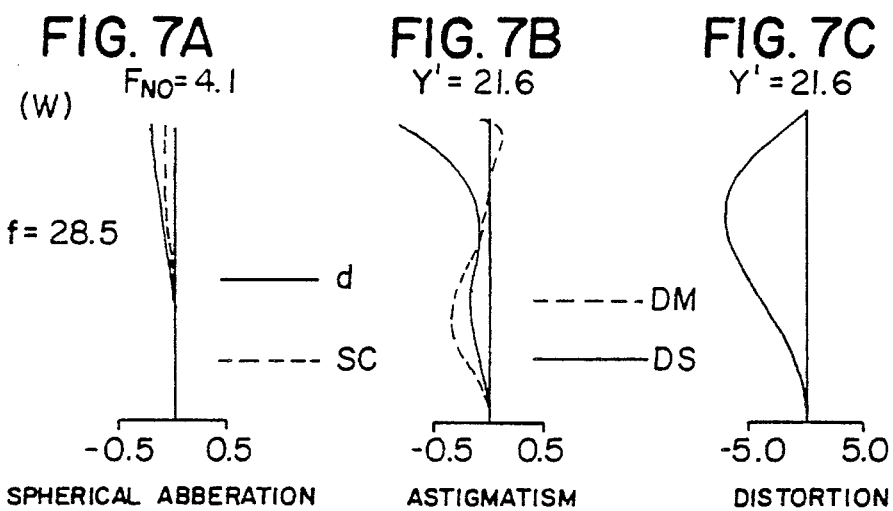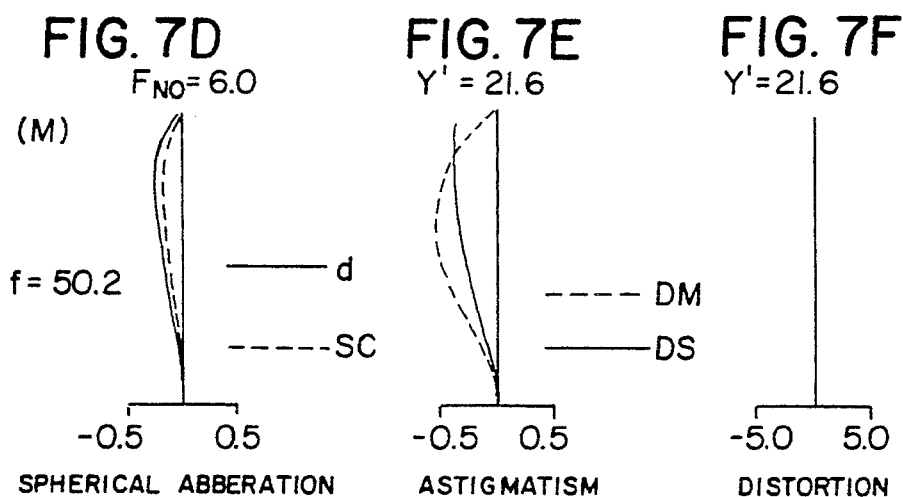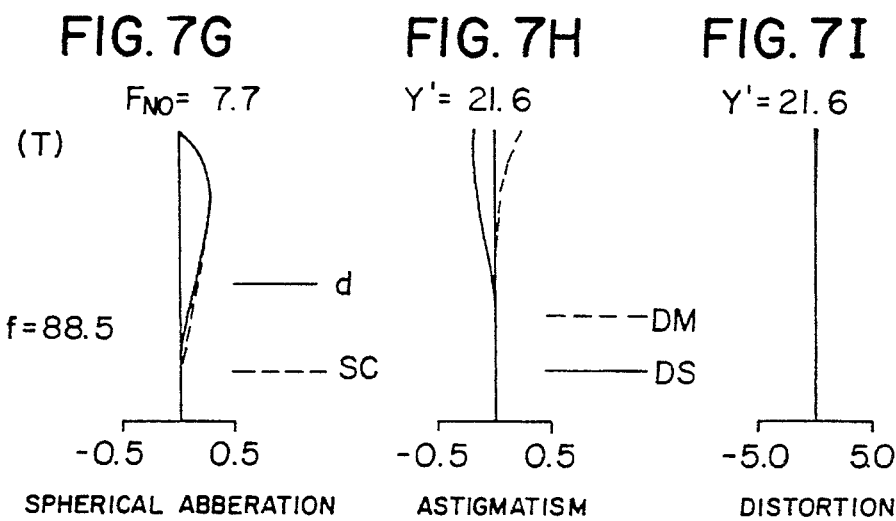

(W)
F_NO=4.1
f=28.5
— d
---- SC
-0.5  0.5
SPHERICAL ABBERATION

Y'=21.6
---- DM
— DS
-0.5  0.5
ASTIGMATIST

Y'=21.6
-5.0  5.0
DISTORTION (M)
F_NO=5.4
f=47.3
— d
---- SC
-0.5  0.5
SPHERICAL ABBERATION

Y'=21.6
---- DM
— DS
-0.5  0.5
ASTIGMATISM

Y'=21.6
-5.0  5.0
DISTORTION (T)
F_NO=6.6
f=78.5
— d
---- SC
-0.5  0.5
SPHERICAL ABBERATION

Y'=21.6
---- DM
— DS
-0.5  0.5
ASTIGMATISM

Y'=21.6
-5.0  5.0
DISTORTION

FIG. 9A
(W) $F_{NO}=4.1$
$f = 39.0$
— d
--- SC
-0.5   0.5
SPHERICAL ABBERATION

FIG. 9B
$Y' = 21.6$
--- DM
— DS
-0.5   0.5
ASTIGMATISM

FIG. 9C
$Y' = 21.6$
-5.0   5.0
DISTORTION

FIG. 9D
$F_{NO}= 6.5$
(M)
$f = 75.5$
— d
--- SC
-0.5   0.5
SPHERICAL ABBERATION

FIG. 9E
$Y' = 21.6$
--- DM
— DS
-0.5   0.5
ASTIGMATISM

FIG. 9F
$Y' = 21.6$
-5.0   5.0
DISTORTION

FIG. 9G
(T) $F_{NO}= 8.7$
$f = 146.0$
— d
--- SC
-0.5   0.5
SPHERICAL ABBERATION

FIG. 9H
$Y' = 21.6$
--- DM
— DS
-0.5   0.5
ASTIGMATISM

FIG. 9I
$Y' = 21.6$
-5.0   5.0
DISTORTION (W) F_{NO}=4.12
f=28.5
— d
----- SC
-0.5  0.5
SPHERICAL ABBERATION

Y'=21.63
---- DM
—— DS
-0.5  0.5
ASTIGMATISM

Y'=21.63
-5.0  5.0
DISTORTION

F_{NO}=6.5
(M)
f=54.0
— d
----- SC
-0.5  0.5
SPHERICAL ABBERATION

Y'=21.63
---- DM
—— DS
-0.5  0.5
ASTIGMATISM

Y'=21.63
-5.0  5.0
DISTORTION

F_{NO}=8.7
(T)
f=102.4
— d
----- SC
-0.5  0.5
SPHERICAL ABBERATION

Y'=21.63
---- DM
—— DS
-0.5  0.5
ASTIGMATISM

Y'=21.63
-5.0  5.0
DISTORTION

5,455,714

ZOOM LENS SYSTEM

BACKGROUND OF THE INVENTION

1. Field of the Invention

This invention relates to a zoom lens system, and more particularly to a zoom lens system for lens shutter cameras with a built-in zoom lens system.

2. Description of the Prior Art

In lens shutter cameras with a built-in zoom lens system, in order to achieve a camera with compactness and low cost, it is desirable to make the photo-taking lens system itself compact and low-cost. As far as compactness is concerned, priority is placed more on compactness when the lenses are being stored in the camera than on the compactness when they are in a photo-taking position (wide-angle or telephoto position). For this purpose, it is necessary to reduce the number of lenses used, as well as to make each lens unit thinner by reducing the thickness of each lens and shortening the distances between lenses.

From this perspective, to achieve compactness, a zoom lens system which comprises three lens units, i.e., a first lens unit having a negative refractive power, a second lens unit having a positive refractive power, and a third lens unit having a negative refractive power, aligned in that order from the object side, and which changes magnification via moving each lens unit, has been proposed in, for example, Patent Gazettes H2-201409, H3-265811, H4-123014 and H4-153613.

However, while the zoom lens systems proposed in the above Patent Gazettes H2-201409 and H3-265811 use a small number of lenses relative to the zoom ratio, they do not meet current needs for compactness and low cost. In the zoom lens system proposed in H2-201409 in particular, because the structure is such that the number of lenses in the first and third lens units is relatively small, but the number of lenses in the second lens unit is large, its cost turns out to be high. In addition, in the zoom lens systems proposed in H4-123014 and H4-153613, although the number of lenses is very small and the thickness of each lens unit is small, chromatic aberrations are not sufficiently corrected.

SUMMARY OF THE INVENTION

This invention was made in consideration of such conditions. Its object is to provide a compact zoom lens system suitable as a zoom lens system comprising negative-positive-negative lens units and designed for a lens shutter camera, which has a high zoom ratio of around 3–4 and good optical performance throughout all magnifications, and which comprises a small number of lenses.

BRIEF DESCRIPTION OF THE DRAWINGS

The above objects and features of the present invention are set forth with particularity in the appended claims. The present invention, both as to its organization and manner of operation, together with further objects and advantages thereof, may best be understood by reference to the following detailed description, taken in connection with the accompanying drawings.

FIGS. 6A to 6I show aberration curves of the first embodiment of the present invention.

FIGS. 7A to 7I show aberration curves of the second embodiment of the present invention.

FIGS. 9A to 9I show aberration curves of the fourth embodiment of the present invention.

DETAILED DESCRIPTION OF THE PREFERRED EMBODIMENTS

Figure 1:
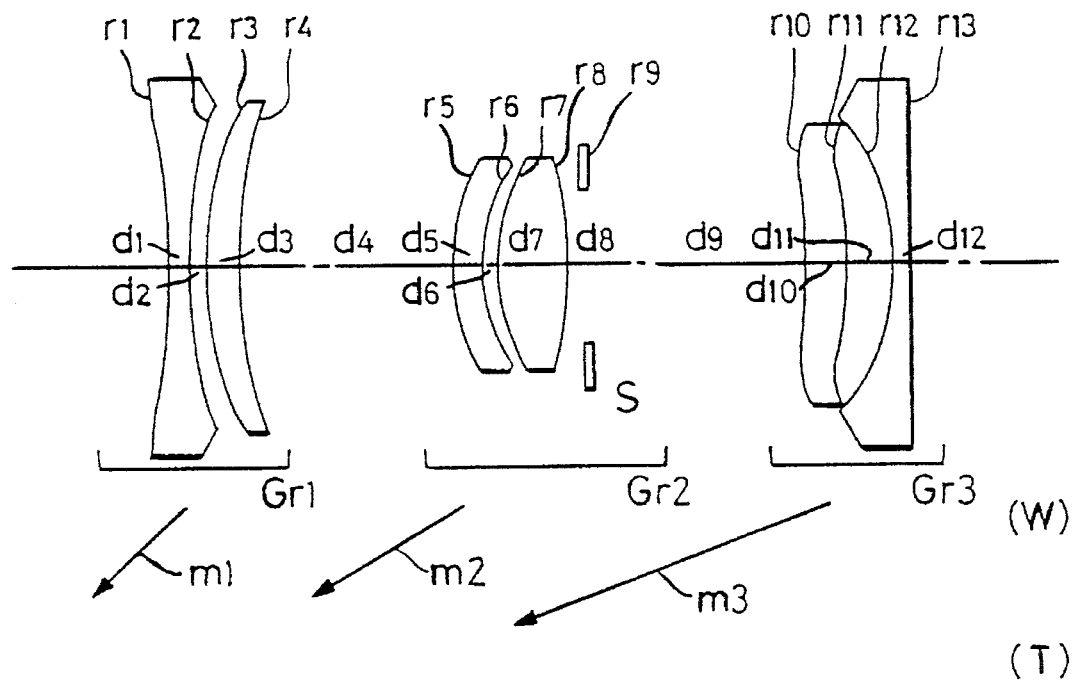
FIG. 1 is a cross-sectional view showing the lens arrangement of a first embodiment of the present invention.

Embodiments of the present invention are described in detail below. First, the first zoom lens system of the present invention is a zoom lens system comprising a first lens unit having a negative refractive power, a second lens unit having a positive refractive power, and a third lens unit having a negative refractive power, aligned in that order from the object side, which performs variation of magnification from wide-angle to telephoto by moving all the lens units to the object side while reducing the distance between the first lens unit and the second lens unit and the distance between the second lens unit and the third lens unit, wherein the first lens unit comprises two lenses, one being negative and the other positive, aligned in that order from the object side; the second lens unit comprises two lenses, one negative and the other positive; and the third lens unit comprises two lenses, one positive and the other negative, aligned in that order from the object side.

By adopting this two-lens structure using negative and positive lenses, chromatic aberrations can be corrected in each lens unit, resulting in correction of chromatic aberrations over all magnifications. Further, the structure in which the first lens unit comprises a negative lens and a positive lens aligned in that order from the object side allows the off-axial light passing through the negative lens to enter the positive lens at a wider angle than the angle of incidence into the negative lens, and therefore the correction of aberrations in off-axial light in wide-angle positions becomes easy.

With regard to the negative and positive lenses comprising the first lens unit, by making the image side surface of the negative lens a concave surface having a strong refractive power and making the positive lens a meniscus lens convex on the object side, the correction of aberrations in off-axial light in wide-angle positions, especially the correction of comatic aberrations, becomes easier. In addition, it is desirable that condition (1) shown below be met.

$$.4 < |\phi_A/\phi_1| < 0.9 \qquad (1)$$

Here, the following is assumed:

$\phi_A$: the refractive power of an air lens formed by the image side surface of the negative lens and the object side surface of the positive lens $\phi_1$: the refractive power of the first lens unit The above condition (1) is a formula which defines the ratio of the refractive power of the first unit to the refractive power of the above air lens. If the ratio exceeds the lower limit of condition (1), the refractive power of the air lens becomes too weak, which leads to insufficient correction of comatic aberrations in wide-angle positions. If the ratio exceeds the upper limit of condition (1), the refractive power of the air lens becomes too strong, which leads to excessive correction of comatic aberrations in wide-angle positions.

In addition, if an aspherical surface is used in the first lens unit, better optical performance can be obtained. It is desirable that the aspherical surface meet either one of the following conditions (2) or (3).

When the aspherical surface is configured such that the positive refractive power becomes weaker or the negative refractive power becomes stronger toward the periphery, and it is assumed that the diameter of the maximum effective optical path of the aspherical surface is $Y_{MAX}$, condition (2) is as shown below in relation to any height Y vertical to the optical axis which satisfies $0.5Y_{MAX} < Y < Y_{MAX}$.

$$-0.01 < \phi_1 \cdot (N'-N) \cdot (d/dY) \cdot \{X(Y) - X_0(Y)\} < .05 \qquad (2)$$

Here, the following is assumed:

$\phi_1$: the refractive power of the first lens unit

N: the index of refraction of the object-side medium of the aspherical surface

N': the index of refraction of the image-side medium of the aspherical surface

X(Y): the configuration of the aspherical surface $X_0(Y)$: the configuration of the reference sphere for the aspherical surface Provided, however, that X(Y) and $X_0(Y)$ are defined by the following formula:

$$X(Y) = r \cdot Y^2 / 1 + \sqrt{1 - \epsilon \cdot Y^2 \cdot r^2} + \sum_{i \geq 2} AiY^i$$

Here, the following is assumed:

r: the standard radius of curvature of the aspherical surface $\epsilon$: conic constant Ai: aspherical coefficient $$X_0(Y) = \bar{r} \cdot Y^2 / \epsilon (1 + \sqrt{1 - \epsilon \cdot Y^2 \cdot \bar{r}^2})$$

Here, the following is assumed:

$\bar{r}$: the paraxial radius of curvature of the aspherical surface ($1/\bar{r} = 1/r + 2 \cdot A2$)

Condition (2) is intended to correct comatic aberrations in wide-angle positions and spherical aberrations in telephoto positions in a balanced fashion. If the value exceeds the lower limit of condition (2), comatic aberrations are excessively corrected and spherical aberrations show a marked tendency to incline toward the under side. If the value exceeds the upper limit of condition (2), comatic aberrations are insufficiently corrected and spherical aberrations show a marked tendency to incline toward the over side.

When the aspherical surface is configured such that the negative refractive power becomes weaker or the positive refractive power becomes stronger toward the periphery, and it is assumed that the diameter of the maximum effective optical path of the aspherical surface is $Y_{MAX}$, condition (3) is as shown below in relation to any height Y vertical to the optical axis which satisfies $0.5Y_{MAX} < Y < Y_{MAX}$.

$$-.05 < \phi_1 \cdot (N'-N) \cdot (d/dY) \cdot \{X(Y) - X_0(Y)\} < .01 \qquad (3)$$

The above condition (3) is also intended to correct comatic aberrations in wide-angle positions and spherical aberrations in telephoto positions in a balanced fashion. If the value exceeds the lower limit of condition (3), comatic aberrations are excessively corrected and spherical aberrations show a marked tendency to incline toward the under side. If the value exceeds the upper limit of condition (3), comatic aberrations are insufficiently corrected and spherical aberrations show a marked tendency to incline toward the over side.

Incidentally, if a lens having an aspherical surface on both sides is used for the above aspherical surface lens, correction of comatic aberrations in wide-angle positions and that of spherical aberrations in telephoto positions can be achieved with better balance. In other words, the excess or insufficiency in the correction of comatic aberrations and spherical aberrations attained by one aspherical surface can be further corrected by the other aspherical surface. Further, it is desirable that one surface meet either one of the above formulae for the aspherical surface and that the other meet the remaining formula.

With regard to the second lens unit comprising a negative lens and a positive lens, it is desirable that the negative lens meet condition (4) shown below.

$$.05 < (R_1 - R_2)/(R_1 + R_2) < .3 \qquad (4)$$

Provided, however, that:

$R_1$: the radius of curvature of the object-side surface of the negative lens $R_2$: the radius of curvature of the image-side surface of the negative lens The above condition (4) is a formula to define the configuration of the negative lens and a condition to correct spherical aberrations and curvature of field in a balanced fashion. If the value exceeds the lower limit of condition (4), spherical aberrations, as well as the field curvature, show a marked tendency to incline toward the under side. If the value exceeds the upper limit of condition (4), spherical aberrations, as well as the field curvature, show a marked tendency to incline toward the over side.

In addition, by constructing the second lens unit such that it meets condition (5) shown below, a compact and high performance zoom lens system may be obtained.

$$.2 < D_2/Y' < .5 \qquad (5)$$

Provided, however, that:

$D_2$: the thickness of the second lens unit along the optical axis

Y': the image height

If the value exceeds the lower limit of condition (5), it becomes difficult to carry out sufficient correction of aberrations, especially that of chromatic aberrations: even if correction were possible, the optical system would be largely unable to perform processing. If the value exceeds the upper limit of condition (5), the total length increases and the entrance pupil moves further away, both of which lead to an increase in the diameter of the first lens unit.

Moreover, by using an aspherical surface in the second lens unit, better optical performance can be obtained. It is desirable that the aspherical surface meet condition (6) shown below. When it is assumed that the diameter of the maximum effective optical path of the aspherical surface is $Y_{MAX}$, condition (6) is as shown below in relation to any height Y vertical to the optical axis which satisfies $0 < Y < Y_{MAX}$.

$$-.01 < \phi_2 \cdot (N'-N) \cdot (d/dY) \cdot (X(Y) - X_0(Y)) < .005 \qquad (6)$$

Here, the following is assumed:

$\phi_2$: the refractive power of the second lens unit

If the value exceeds the upper limit of condition (6), spherical aberrations show a marked tendency to incline toward the under side over all magnifications while flaring of off-axial light shows a marked tendency to occur in telephoto positions. If the value exceeds the lower limit of condition (6). spherical aberrations show a marked tendency to incline toward the over side over all magnifications while flaring of off-axial light shows a marked tendency to be excessively corrected in telephoto positions. Incidentally, if a lens having an aspherical surface on both sides is used for the above aspherical surface lens, spherical aberrations and flaring of off-axial light in telephoto positions can be corrected in a more balanced fashion. In other words. the excess or insufficiency in the correction of spherical aberrations and flaring made by one aspherical surface can be further corrected by the other aspherical surface. It is desirable that either aspherical surface meet condition (6) shown above.

In addition, by constructing the third lens unit using a positive lens and a negative lens aligned in that order from the object side, the back focal length may be made the smallest necessary. Moreover, by having one of the surfaces of the third lens unit be an aspherical surface, better optical performance can be obtained. It is desirable that the aspherical surface meet either one of conditions (7) or (8) shown below.

When the aspherical surface is configured such that the positive refractive power becomes stronger or the negative refractive power becomes weaker toward the periphery, and it is assumed that the diameter of the maximum effective optical path of the aspherical surface is $Y_{MAX}$, condition (7) is as shown below in relation to any height Y vertical to the optical axis which satisfies $0.5Y_{MAX} < Y < Y_{MAX}$.

$$-.5 < \phi_3 \cdot (N'-N) \cdot (d/dY) \cdot \{X(Y) - X_0(Y)\} < .01 \quad (7)$$

Here, the following is assumed:

$\phi_3$: the refractive power of the third lens unit

When the value exceeds the lower limit of condition (7), negative distortion and the tendency toward negative deviation in field curvature become marked in positions ranging from the shortest focal length through the middle focal length, while spherical aberrations incline toward the under side in telephoto positions. If the value exceeds the upper limit of condition (7), positive distortion and the tendency toward positive deviation in field curvature become marked in positions ranging from the shortest focal length through the middle focal length, while spherical aberrations incline toward the under side in telephoto positions.

When the aspherical surface is configured such that the positive refractive power becomes weaker or the negative refractive power becomes stronger toward the periphery, and it is assumed that the diameter of the maximum effective optical path of the aspherical surface is $Y_{MAX}$, condition (8) is as shown below in relation to any height Y vertical to the optical axis which satisfies $0.5Y_{MAX} < Y < Y_{MAX}$.

$$.01 < \phi_3 \cdot (N'-N) \cdot (d/dY) \cdot (X(Y) - X_0(Y)) < .05 \quad (8)$$

When the value exceeds the lower limit of condition (8), negative distortion and the tendency toward negative deviation in field curvature become marked in positions ranging from the shortest focal length to the middle focal length, while spherical aberrations incline toward the under side in telephoto positions. If the value exceeds the upper limit of condition (8), positive distortion and the tendency toward positive deviation in field curvature become marked in positions ranging from the shortest focal length to the middle focal length, while spherical aberrations incline toward the over side in telephoto positions.

Incidentally, if a lens having an aspherical surface on both sides is used for the above aspherical surface lens, correction of spherical aberrations, distortion and curvature of field can be made in a more balanced fashion. In other words, the excess or insufficiency in correction of spherical aberrations, distortion and field curvature attained by one aspherical surface can be further corrected by the other aspherical surface. Further, it is desirable that one surface meet either one of the above formulae for the aspherical surface and that the other meet the remaining formula.

It is also desirable that any lens having an aspherical surface on both sides belonging to any of the lens units meet condition (9) shown below.

$$.05 < d_{ASP}/Y_{MAX} < 1 \quad (9)$$

Here, the following is assumed:

$d_{ASP}$: the axial distance of the lens having an aspherical surface on both sides Condition (9) is a formula to define the diameter of the maximum effective optical path and the core thickness of the lens having an aspherical surface on both sides. If the value exceeds the lower limit of condition (9), the light passing through the two-sided aspherical lens goes into the front surface and comes out of the back surface at almost the same position: therefore, the aberration correction effect obtained by virtue of adopting the two-sided aspherical lens may no longer be obtained. If the value exceeds the upper limit of condition (9). the core thickness becomes too thick, as a result of which compactness is lost and the cost increases because of increased difficulty in manufacturing, which defeats the purpose of the present invention.

It is also desirable that condition (10) shown below be met.

$$.5 < D_T/Y < .0 \quad (10)$$

Here, the following is assumed:

$D_T$: the distance between the vertex of the first surface and the vertex of the last surface at the longest focal length position If the value exceeds the lower limit of condition (10), correction of chromatic aberrations becomes difficult in one of the lens units: even if the correction were possible, the optical system would be largely unable to perform processing. If the value exceeds the upper limit of condition (10). the total length increases and the entrance pupil moves farther away, both of which lead to an increase in the diameter of the first lens unit.

In the present invention, each lens unit comprises two lenses, one being a negative lens and the other a positive lens: however, the construction may be such that a lens having a weak refractive power is added to one of the lens units so that it has three or even more lenses. In addition, even if the zoom lens system is constructed with four or more lens units by adding a lens unit or lens units having weak refractive power, the effect of the present invention will not change.

The second embodiment of the zoom lens system of the present invention is a zoom lens system which comprises a first lens unit having a negative refractive power, a second lens unit having a positive refractive power, and a third lens unit having a negative refractive power, aligned in that order from the object side, and which changes the magnification from wide-angle to telephoto by moving all the lens units to the object side while reducing the distance between the first lens unit and the second lens unit and the distance between the second lens unit and the third lens unit, wherein each of the first, second and third lens units has at least one negative lens and at least one positive lens, and the second lens unit has an aspherical surface while meeting condition (11) shown below.

$$.1 < (E_{1-2W} - E_{1-2T})/(E_{2-3W} - E_{2-3T}) < .1 \quad (11)$$

Provided, however, that:

$E_{1-2W}$: the distance between the principal point of the first lens unit and that of the second lens unit at the shortest focal length position $E_{1-2T}$: the distance between the principal point of the first lens unit and that of the second lens unit at the longest focal length position $E_{2-3W}$: the distance between the principal point of the second lens unit and that of the third lens unit at the shortest focal length position $E_{2-3T}$: the distance between the principal point of the second lens unit and that of the third lens unit at the longest focal length position It is necessary to perform correction of chromatic aberrations in a zoom lens system, especially those in a high-magnification zoom lens system, in each lens unit. Therefore, because a negative lens and a positive lens are required for each lens unit, the above construction is characterized by the fact that each lens unit has at least one negative lens and one positive lens.

Further, the use of an aspherical surface for the second lens unit is effective for the correction of aberrations which occur when the number of lenses in the second lens unit is reduced. It is desirable that the aspherical surface meet condition (6) shown above. In this case, as well as in the cases described above, if the value exceeds the upper limit of condition (6), spherical aberrations show a marked tendency to incline toward the under side throughout all magnifications, while flaring of off-axial light shows a marked tendency to occur in telephoto positions. If the value exceeds the lower limit of condition (6), spherical aberrations show a marked tendency to incline toward the over side throughout all magnifications, while flaring of off-axial light shows a marked tendency to be excessively corrected in telephoto positions. Incidentally, if a lens having an aspherical surface on both sides is used for the above aspherical surface lens, correction of spherical aberrations and flaring of off-axial light in telephoto positions can be corrected in a more balanced fashion. In other words, the excess or insufficiency in the correction of spherical aberrations and flaring achieved by one aspherical surface can be further corrected by the other aspherical surface. It is desirable that both surfaces meet condition (6) above.

Condition (11) above defines the ratio of the change in the distance between the first lens unit and the second lens unit to the change in the distance between the second lens unit and the third lens unit when the magnification is changed. It means that the change in the distance between the first lens unit and the second lens unit should be nearly equal to or smaller than the change in the distance between the second lens unit and the third lens unit.

If the value exceeds the lower limit of condition (11), the amount of movement of the first lens unit and that of the second lens unit become almost identical, and therefore the zoom lens system ends up functioning in the almost same manner as a two-component zoom lens system. The amount of movement of each lens unit then increases, which results in an increase in the total length of the optical system, especially of that at the longest focal length position. If the value exceeds the upper limit of condition (11), the distance between the first lens unit and the second lens unit becomes too large, which results in an increase in the total length at the shortest focal length position. This increases the angle of incidence of the off-axial light into the first lens unit, leading to an increase in the diameter of the first lens unit.

By adopting the above-described construction of the second embodiment of the zoom lens system of the present invention, chromatic aberrations can be corrected. In addition, the thickness of the second lens unit along the optical axis may be reduced and the total length at the shortest and longest focal length positions and the diameter of the first lens unit can be reduced, which makes it possible to achieve a compact high performance zoom lens system for lens shutter cameras desired today.

Moreover, by using a construction which meets conditions (12) through (22) shown below, a more compact high performance zoom lens system can be obtained.

In addition to condition (11) above, condition (12) below is another desirable condition regarding the amount of movement.

$$.0 < E_{12-3W} \times (f_W/f_T) < .3 \quad (12)$$

Provided, however, that:

$E_{12-3W}$: the distance between the principal point of the combined first and second lens units and that of the third lens unit at the shortest focal length position Condition (12) defines the ratio of the distance between the principal point of the combined first and second lens units and that of the third lens unit at the shortest focal length position to the zoom ratio. If the value exceeds the lower limit of condition (12), the refractive power of the third lens unit becomes too strong, as a result of which positive distortion at the shortest focal length position becomes marked, while spherical aberrations show a marked tendency to incline toward the over side at the longest focal length position. If the value exceeds the upper limit of condition (12), the refractive power of the third lens unit becomes too weak, as a result of which the amount of movement increases, leading to an increase in the total length at the longest focal length position. Incidentally, in order to further shorten the shortest focal length, it is desirable that $E_{12-3W} \times (f_W/f_T)$ be smaller than 6.2.

Next, the preferred condition with regard to the distance between the lens front surface and the aperture is explained. For example, a construction that meets condition (13) shown below is desirable.

$$.0 < T_{1-SW} \times (f_W/f_T) < .0 \quad (13)$$

Here, the following is assumed:

$T_{1-SW}$: the distance between the surface closest to the object and the aperture at the shortest focal length position Condition (13) defines the ratio of the distance between the first surface and the aperture at the shortest focal length position to the zoom ratio, and is a formula to obtain appropriate diameters for the first lens unit and the third lens unit in accordance with the zoom ratio. If the value exceeds the lower limit of condition (13), the aperture is positioned too far toward the front, as a result of which the diameter of the third lens unit becomes large and positive distortion becomes marked at the shortest focal length position. If the value exceeds the upper limit of condition (13), the aperture is positioned too far toward the back, as a result of which the diameter of the first lens unit becomes large and negative distortion becomes marked at the shortest focal length position.

In addition, as a desirable condition pertaining to the distance between the principal point of the first lens unit and that of the second lens unit vis-a-vis the zoom ratio, there is condition (14) shown below.

$$.2 < E_{1-2W} \times (f_W/f_T) < .3 \tag{14}$$

Here, the following is assumed:

$f_W$: the focal length of the total system at the shortest focal length position $f_T$: the focal length of the total system at the longest focal length position Condition (14) defines the ratio of the distance between the first lens unit and the second lens unit at the shortest focal length position to the zoom ratio. By setting an appropriate distance between the first lens unit and the second lens unit in accordance with the zoom ratio, the total length at the shortest and longest focal length positions may be made optimal. If the value exceeds the lower limit of condition (14), the distance between the first lens unit and the second lens unit becomes too small for the zoom ratio, as a result of which sufficient variation cannot be attained by the first and second lens units. As a result, the amount of movement of each lens unit increases, leading to an increase in the total length at the longest focal length position, while the shortened back focal length leads to an increase in the diameter of the third lens unit. If the value exceeds the upper limit of condition (14), the distance between the first lens unit and the second lens unit becomes too large for the zoom ratio, which leads to an increase in the diameter of the first lens unit as well as an increase in the total length at the shortest focal length position.

Next, a desirable condition regarding the change of magnification by the second lens unit is explained. For example, a construction that meets condition (15) shown below is desirable.

$$.4 < (\beta_{2T} \times \beta_{3W})/(\beta_{2W} \times \beta_{3T}) < .6 \tag{15}$$

Here, the following is assumed:

$\beta_{2T}$: the paraxial lateral magnification of the second lens unit at the longest focal length position $\beta_{2W}$: the paraxial lateral magnification of the second lens unit at the shortest focal length position $\beta_{3T}$: the paraxial lateral magnification of the third lens unit at the longest focal length position $\beta_{3W}$: the paraxial lateral magnification of the third lens unit at the shortest focal length position Condition (15) defines the ratio of the second lens unit's responsibility for the change of magnification from the shortest focal length position to the longest focal length position to the third lens unit's responsibility for the change of magnification from the shortest focal length position to the longest focal length position, and means that the level of contribution of the second lens unit should be approximately one half of that of the third lens unit. If the value exceeds the lower limit of condition (15), the third lens unit must attain too much of the needed variation, as a result of which the amount of movement of the third lens unit increases, leading to an increase in the total length at the longest focal length position. If the value exceeds the upper limit of condition (15), the second lens unit must attain too much of the needed variation, as a result of which the distance between the first lens unit and the second lens unit increases at the shortest focal length position, resulting in an increase in the total length at the shortest focal length position and an increase in the diameter of the first lens unit.

As a desirable condition regarding the change in the distance between the principal point of the second lens unit and that of the third lens unit relative to the zoom ratio, there is condition (16) shown below, besides condition (15) above.

$$.08 < (E_{2-3T} \times f_W)/(E_{2-3W} \times f_T) < .17 \tag{16}$$

Condition (16) defines the ratio of the change in the distance between the principal point of the second lens unit and that of the third lens unit when the magnification is changed from the shortest focal length position to the longest focal length position to the zoom ratio. If the value exceeds the lower limit of condition (16), the amount of movement increases, leading to an increase in the total length at the longest focal length position. If the value exceeds the upper limit of condition (16), an increase in the total length at the shortest focal length position as well as in the diameter of the first lens unit results.

With regard to the focal length of the second lens unit in relation to the zoom ratio, a construction that meets condition (17) below is desired.

$$.0 < f_2 \times (f_W/f_T) < .5 \tag{17}$$

In particular, it is preferred that condition (18) below be met.

$$.0 < f_2 \times (f_W/f_T) < .5 \tag{18}$$

Here, the following is assumed:

$f_2$: the focal length of the second lens unit

Conditions (17) and (18) define the ratio of the focal length of the second lens unit to the zoom ratio. When these conditions are met, a focal length of the second lens unit appropriate to the zoom ratio can be obtained. If the value exceeds the lower limit of condition (17), the focal length of the second lens unit becomes too small relative to the zoom ratio, as a result of which various aberrations worsen and they are no longer corrected even using aspherical surfaces. As a result, an increase in the number of lenses and in the total length results. If the value exceeds the upper limit of condition (17), the focal length of the second lens unit becomes too large relative to the zoom ratio, as a result of which the amount of movement increases, leading to an increase in the total length.

With regard to the relationship between the ratio of the amount of movement of the first lens unit to that of the second lens unit and the distances between principal points of each lens unit when the magnification is varied, a construction which meets conditions (19) and (20) shown below is preferred.

$$.0 < (M_2 \times E_{1-2W})/(M_1 \times E_{1-2T}) < .0 \tag{19}$$

$$.45 < (M_2 \times E_{2-3T})/(M_1 \times E_{2-3W}) < .8 \tag{20}$$

Here, the following is assumed:

$M_1$: the amount of movement of the first lens unit when the magnification is varied from the shortest focal length position to the longest focal length position $M_2$: the amount of movement of the second lens unit when the magnification is varied from the shortest focal length position to the longest focal length position Condition (19) defines the relationship between (a) the ratio of the amount of movement of the first lens unit to that of the second lens unit when the magnification is changed from the shortest focal length position to the longest focal length position and (b) the ratio of the distance between the first lens unit and the second lens unit at the shortest focal length position to that at the longest focal length position, whereas condition (20) defines the relationship between (a) the ratio of the amount of movement of the first lens unit to that of the second lens unit when the magnification is changed from the shortest focal length position to the longest focal length position and (b) the ratio of the amount of movement of the second lens unit to that of the third lens unit when the magnification is changed from the shortest focal length position to the longest focal length position. If the value exceeds the lower limits of the respective conditions, the amount of movement increases and an increase in the total length at the longest focal length position results. If the value exceeds the upper limits of the respective conditions, the total length at the shortest focal length position increases and an increase in the diameter of the first lens unit results.

With regard to the relationship between the distances between the principal points of each lens unit and the magnifications attained by the second and third lens units, a construction that meets condition (21) shown below is preferred.

$$-0.3 < (E_{1-2T} \times \beta_{3T})/(E_{2-3T} \times \beta_{2T}) < -5.0 \quad (21)$$

Condition (21) defines the relationship between (1) the ratio of (a) the distance between the first lens unit and the second lens unit at the longest focal length position to (b) the distance between the second lens unit and the third lens unit and (2) the ratio of the magnification of the second lens unit to that of the third lens unit. It is a formula to control the size and the correction of various aberrations at the longest focal length position in a balanced fashion.

Further, with regard to the focal lengths of the first and third lens units, it is desirable that condition (22) shown below be met.

$$.5 < f_1/f_3 < 2.5 \quad (22)$$

Here, the following is assumed:

$f_1$: the focal length of the first lens unit $f_3$: the focal length of the third lens unit Condition (22) defines the focal lengths of the first and third lens units. If the value exceeds the lower limit of condition (22), the refractive power of the first lens unit becomes too strong in relation to the refractive power of the third lens unit, as a result of which positive distortion occurs at the shortest focal length position. If the value exceeds the upper limit of condition (22), the refractive power of the third lens unit becomes too strong in relation to the refractive power of the first lens unit, as a result of which negative distortion occurs at the shortest focal length position.

Through the above construction, a high magnification zoom lens system having high performance, compactness and a small number of lenses can be obtained.

Embodiments of the zoom lens system of the present invention are shown below with regard to various values. In each embodiment, $ri(i=1,2,3,\ldots)$ refers to the radius of curvature of the ith surface from the object side; $di(i=1,2,3,\ldots)$ refers to the ith axial distance from the object side; and $Ni(i=1,2,3,\ldots)$ and $vi(i=1,2,3,\ldots)$ refer to the index of refraction and the Abbe number, respectively, of the ith lens from the object side in relation to the D line. f refers to the focal length of the total system and F NO refers to the F-number at the full aperture.

In each value embodiment, the asterisk marking the radius of curvature of a surface means that the marked surface is aspherical and $D^{(n)}$ means the nth power of 10.

Figure 2:
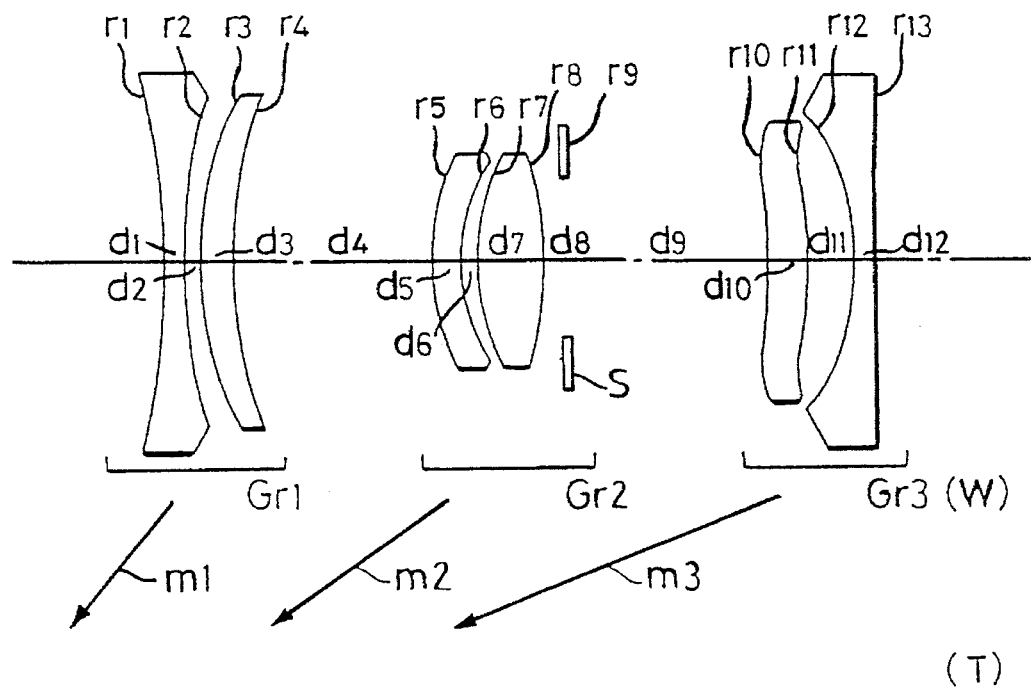
FIG. 2 is a cross-sectional view showing the lens arrangement of a second embodiment of the present invention.
Figure 3:
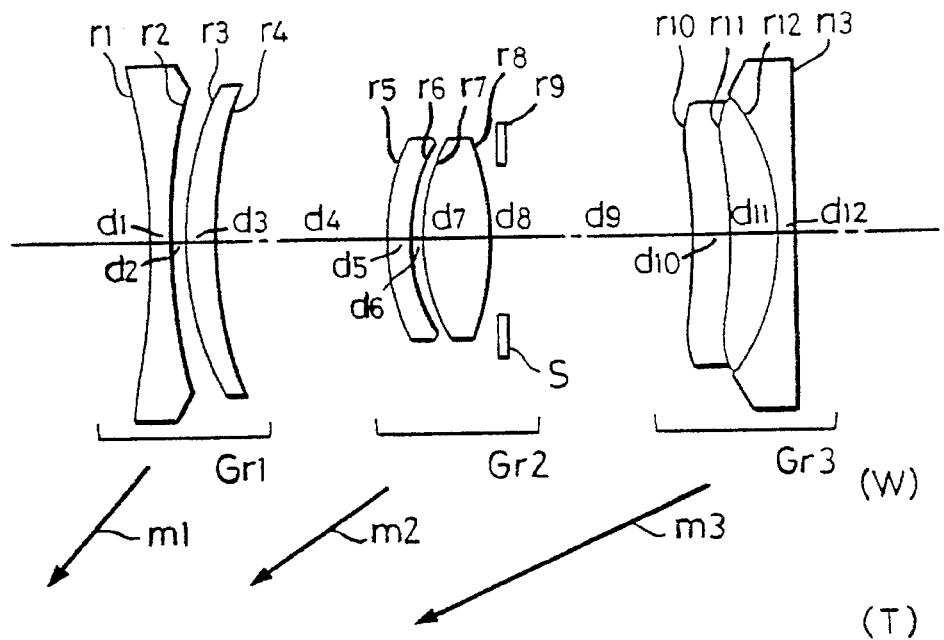
FIG. 3 is a cross-sectional view showing the lens arrangement of a third embodiment of the present invention.
Figure 4:
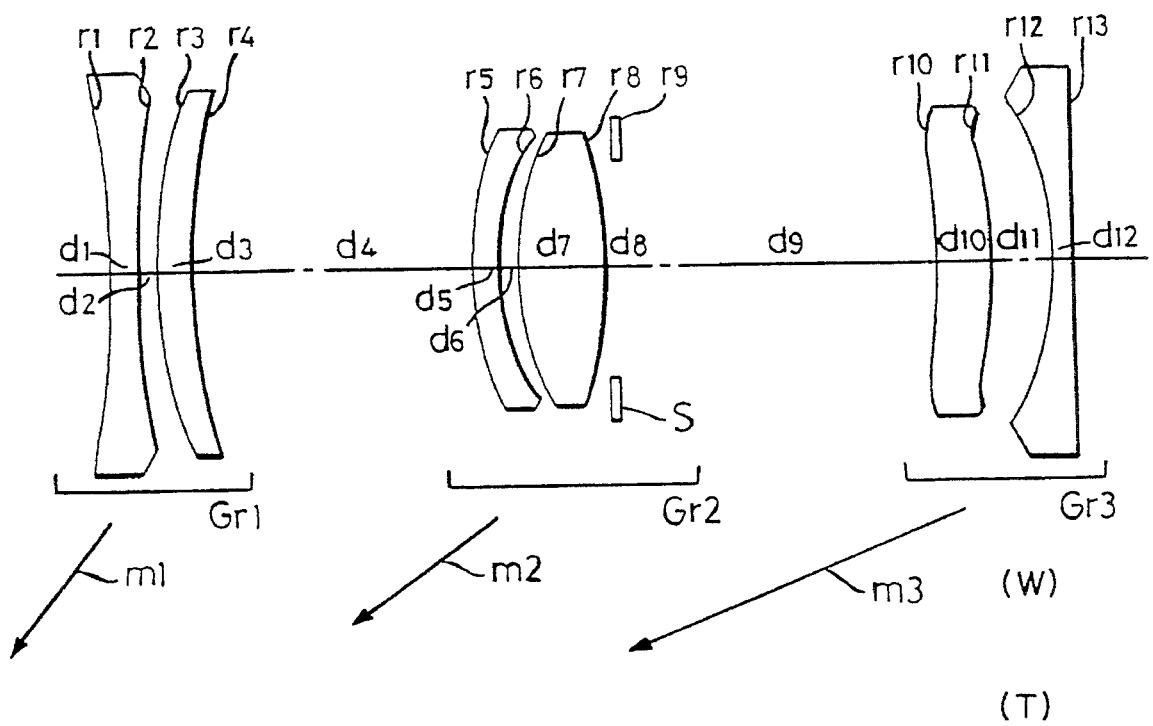
FIG. 4 is a cross-sectional view showing the lens arrangement of a fourth embodiment of the present invention.
Figure 5:
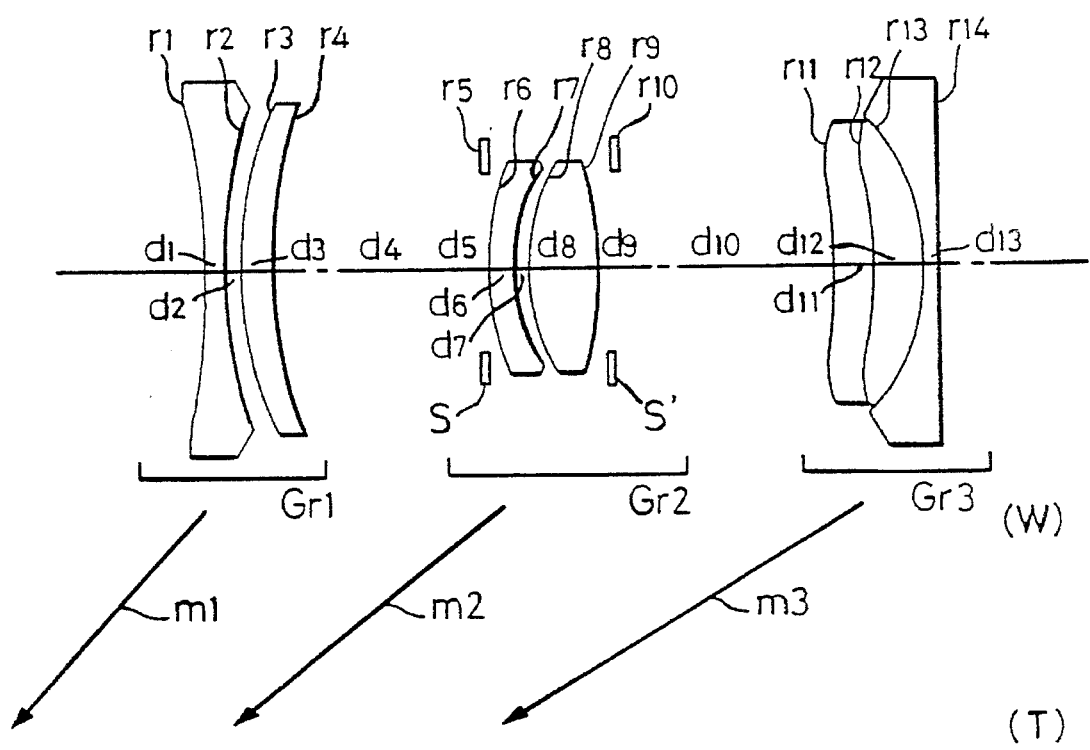
FIG. 5 is a cross-sectional view showing the lens arrangement of a fifth embodiment of the present invention.

FIGS. 1 through 5 show the lens constructions corresponding to above value embodiments 1 through 5. showing the lens arrangement at the shortest focal length position (W). Arrows m1, m2 and m3 in the figures indicate the movement of the first lens unit (Gr1), the second lens unit (Gr2) and the third lens unit (Gr3) from the shortest focal length position (W) to the longest focal length position (T), respectively.

Embodiments 1 through 4 are constructed with a first lens unit (Gr1) comprising a negative lens with concave surfaces and a positive meniscus lens with a convex surface on the object side, a second lens unit (Gr2) comprising a negative meniscus lens with a concave surface on the image side, a positive lens with convex surfaces and an aperture (S) and a third lens unit (Gr3) comprising a positive meniscus lens with a convex surface on the image side and a negative lens with concave surfaces, all of which are aligned in the above order from the object side. Both surfaces of the negative lens of the first lens unit (Gr1), both surfaces of the positive lens of the second lens unit (Gr2), and both surfaces of the positive lens of the third lens unit (Gr3) are aspherical.

Embodiment 5 is constructed with a first lens unit (Gr1) comprising a negative lens with concave surfaces and a positive meniscus lens with a convex surface on the object side, a second lens unit (Gr2) comprising an aperture (S), a negative meniscus lens with a concave surface on the image side, a positive lens with convex surfaces and a darkening screen (S') and a third lens unit (Gr3) comprising a positive meniscus lens with a convex surface on the image side and a negative lens with concave surfaces, all of which are aligned in the above order from the object side. Both surfaces of the negative lens of the first lens unit (Gr1). both surfaces of the positive lens of the second lens unit (Gr2) and both surfaces of the positive lens of the third lens unit (Gr3) are aspherical.

Figure 8A:
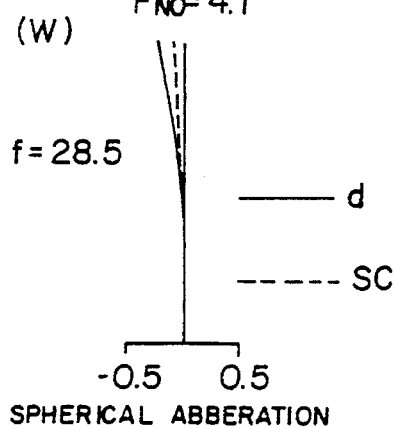
FIGS. 8A to 8I show aberration curves of the third embodiment of the present invention.
Figure 8B:
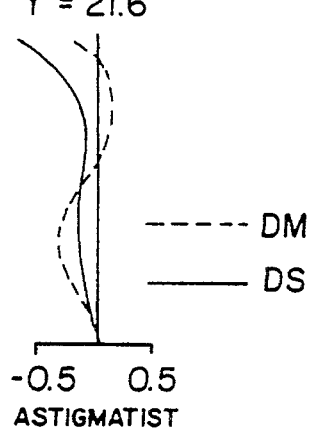
Figure 8C:
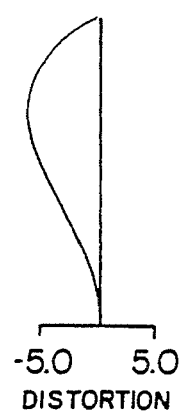
Figure 8D:
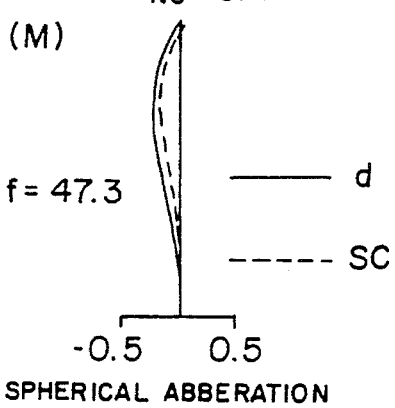
Figure 8E:
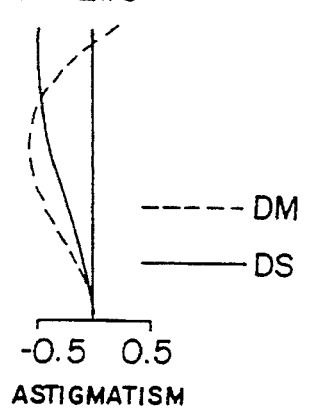
Figure 8F:
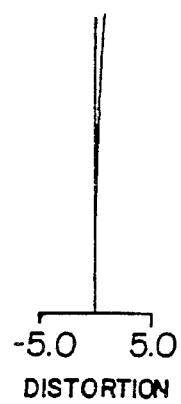
Figure 8G:
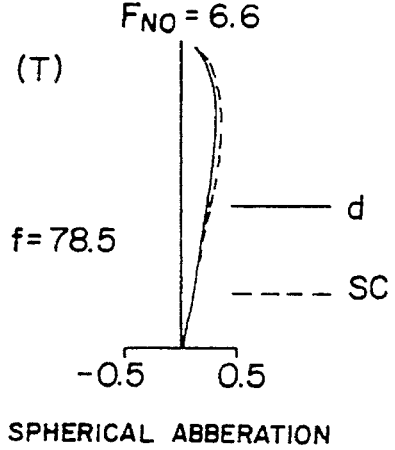
Figure 8H:
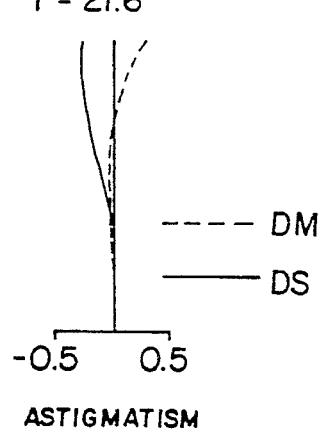
Figure 8I:
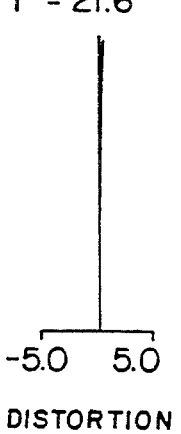
Figure 10A:
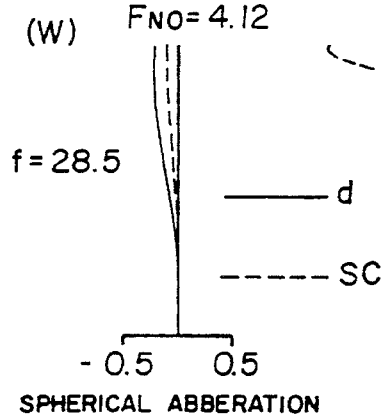
FIGS. 10A to 10I show aberration curves of the fifth embodiment of the present invention.
Figure 10B:
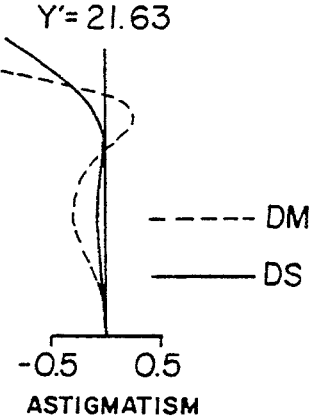
Figure 10C:
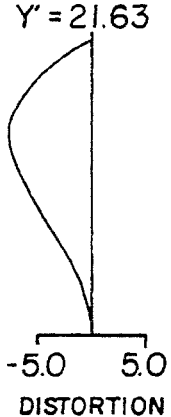
Figure 10D:
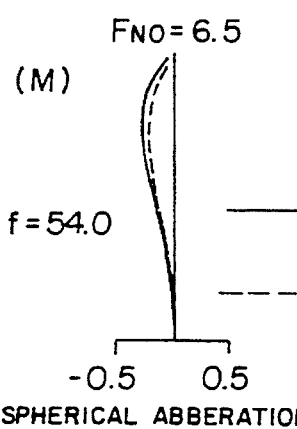
Figure 10E:
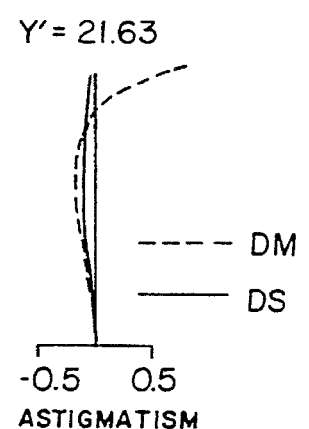
Figure 10F:
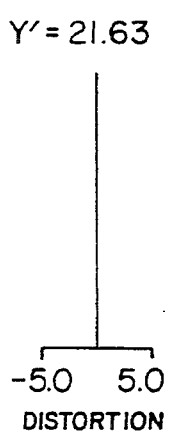
Figure 10G:
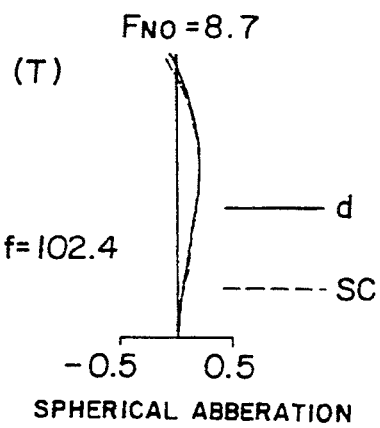
Figure 10H:
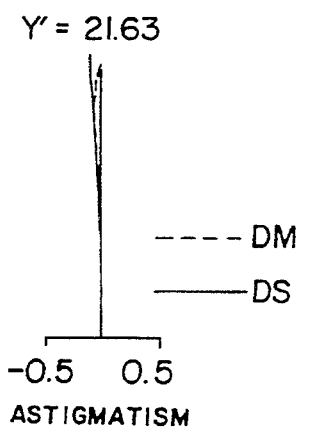
Figure 10I:
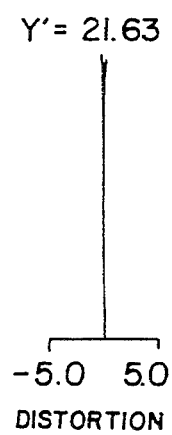

FIGS. 6 through 10 show the aberrations corresponding to the above value embodiments 1 through 5. In the drawings, (W) refers to the aberrations at the shortest focal length position, (M) refers to the aberrations at the middle focal length position and (T) refers to the aberrations at the longest focal length position. Solid line (d) represents the aberrations in relation to the D line while dotted line (SC) indicates the sine condition. Dotted line (DM) and solid line (DS) represent astigmatisms on the meridional plane and the sagittal plane, respectively.

The values corresponding to the condition of each of the value embodiments are as shown in the following table.

<Embodiment 1>
f = 28.5~54.0~102.4 FNO = 4.1~6.5~8.7

| Radius of Curvature | | Axial Distance | | Refractive Index | Abbe Number |
|---|---|---|---|---|---|
| r1* | −621.118 | d1 | 1.400 | N1 1.75450 | v1 51.57 |
| r2* | 29.169 | d2 | 1.000 | | |
| r3 | 24.630 | d3 | 2.200 | N2 1.84666 | v2 23.82 |
| r4 | 33.016 | d4 | 14.500~6.500~2.000 | | |
| r5 | 16.674 | d5 | 1.800 | N3 1.83350 | v3 21.00 |
| r6 | 12.065 | d6 | 1.000 | | |
| r7* | 13.884 | d7 | 4.700 | N4 1.58170 | v4 69.75 |

-continued

<Embodiment 1>
f = 28.5~54.0~102.4 FNO = 4.1~6.5~8.7

| Radius of Curvature | | Axial Distance | Refractive Index | Abbe Number |
|---|---|---|---|---|
| r8* | −23.266 | d8 1.000 | | |
| r9 | ∞ (aperture) | d9 15.149~7.388~2.200 | | |
| r10* | −28.494 | d10 2.800 | N5 1.84666 | v5 23.82 |
| r11* | −21.086 | d11 3.300 | | |
| r12 | −15.361 | d12 1.100 | N6 1.67000 | v6 57.07 |
| r13 | 1528.748 | | | |

Aspherical Coefficients r1: $\epsilon = 0.10000 \times 10$  r8: $\epsilon = 0.10000 \times 10$
A4 = $-0.28924 \times 10^{-3}$   A4 = $0.16286 \times 10^{-4}$
A6 = $0.35957 \times 10^{-5}$    A6 = $-0.60871 \times 10^{-6}$
A8 = $-0.21747 \times 10^{-7}$   A8 = $0.22960 \times 10^{-7}$
A10 = $0.71141 \times 10^{-10}$  A10 = $-0.26662 \times 10^{-10}$
A12 = $-0.97643 \times 10^{-13}$ A12 = $-0.29724 \times 10^{-11}$
r2: $\epsilon = 0.10000 \times 10$  r10: $\epsilon = 0.10000 \times 10$
A4 = $-0.29376 \times 10^{-3}$   A4 = $0.11827 \times 10^{-3}$
A6 = $0.41997 \times 10^{-5}$    A6 = $-0.59324 \times 10^{-7}$
A8 = $-0.26991 \times 10^{-7}$   A8 = $0.55447 \times 10^{-7}$
A10 = $0.10207 \times 10^{-9}$   A10 = $-0.65625 \times 10^{-9}$
A12 = $-0.12441 \times 10^{-12}$ A12 = $0.18762 \times 10^{-11}$
r7: $\epsilon = 0.10000 \times 10$  r11: $\epsilon = 0.10000 \times 10$
A4 = $-0.25981 \times 10^{-4}$   A4 = $0.10287 \times 10^{-3}$
A6 = $-0.29230 \times 10^{-6}$   A6 = $0.59974 \times 10^{-6}$
A8 = $0.15188 \times 10^{-7}$    A8 = $0.82675 \times 10^{-8}$
A10 = $-0.53736 \times 10^{-11}$ A10 = $0.43851 \times 10^{-9}$
A12 = $-0.17459 \times 10^{-11}$ A12 = $-0.43672 \times 10^{-11}$ <Embodiment 2>
f = 28.5~50.2~88.5 FNO = 4.1~6.0~7.7

| Radius of Curvature | | Axial Distance | Refractive Index | Abbe Number |
|---|---|---|---|---|
| r1* | −366.074 | d1 1.400 | N1 1.75450 | v1 51.57 |
| r2* | 30.699 | d2 1.000 | | |
| r3 | 24.261 | d3 2.200 | N2 1.84666 | v2 23.82 |
| r4 | 31.802 | d4 13.300~5.900~2.000 | | |
| r5 | 16.464 | d5 1.800 | N3 1.83350 | v3 21.00 |
| r6 | 11.941 | d6 1.000 | | |
| r7* | 13.630 | d7 4.700 | N4 1.58170 | v4 69.75 |
| r8* | −22.818 | d8 1.000 | | |
| r9 | ∞ (aperture) | d9 14.232~7.365~2.200 | | |
| r10* | −28.037 | d10 2.800 | N5 1.84666 | v5 23.82 |
| r11* | −20.959 | d11 3.300 | | |
| r12 | −15.690 | d12 1.100 | N6 1.67000 | v6 57.07 |
| r13 | 619.748 | | | |

Aspherical Coefficients r1: $\epsilon = 0.10000 \times 10$  r8: $\epsilon = 0.10000 \times 10$
A4 = $-0.29078 \times 10^{-3}$   A4 = $0.18117 \times 10^{-4}$
A6 = $0.35785 \times 10^{-5}$    A6 = $-0.59006 \times 10^{-6}$
A8 = $-0.21912 \times 10^{-7}$   A8 = $0.22844 \times 10^{-7}$
A10 = $0.75087 \times 10^{-10}$  A10 = $-0.27991 \times 10^{-10}$
A12 = $-0.11108 \times 10^{-12}$ A12 = $-0.29793 \times 10^{-11}$
r2: $\epsilon = 0.10000 \times 10$  r10: $\epsilon = 0.10000 \times 10$
A4 = $-0.29359 \times 10^{-3}$   A4 = $0.11948 \times 10^{-3}$
A6 = $0.41702 \times 10^{-5}$    A6 = $-0.30187 \times 10^{-7}$
A8 = $-0.27005 \times 10^{-7}$   A8 = $0.55602 \times 10^{-7}$
A10 = $0.10405 \times 10^{-9}$   A10 = $-0.65552 \times 10^{-9}$
A12 = $-0.12023 \times 10^{-12}$ A12 = $0.18843 \times 10^{-11}$
r7: $\epsilon = 0.10000 \times 10$  r11: $\epsilon = 0.10000 \times 10$
A4 = $-0.28259 \times 10^{-4}$   A4 = $0.10599 \times 10^{-3}$
A6 = $-0.30888 \times 10^{-6}$   A6 = $0.64722 \times 10^{-6}$
A8 = $0.15259 \times 10^{-7}$    A8 = $0.84444 \times 10^{-8}$
A10 = $-0.42376 \times 10^{-11}$ A10 = $0.43930 \times 10^{-9}$
A12 = $-0.17372 \times 10^{-11}$ A12 = $-0.43584 \times 10^{-11}$ <Embodiment 3>
f = 28.5~47.3~78.5 FNO = 4.1~5.4~6.6

| Radius of Curvature | | Axial Distance | Refractive Index | Abbe Number |
|---|---|---|---|---|
| r1* | −252.010 | d1 1.400 | N1 1.75450 | v1 51.57 |
| r2* | 31.662 | d2 1.000 | | |
| r3 | 23.990 | d3 2.200 | N2 1.84666 | v2 23.82 |
| r4 | 31.545 | d4 12.000~5.250~2.000 | | |
| r5 | 16.428 | d5 1.800 | N3 1.83350 | v3 21.00 |
| r6 | 11.919 | d6 1.000 | | |
| r7* | 13.564 | d7 4.700 | N4 1.58170 | v4 69.75 |
| r8* | −22.068 | d8 1.000 | | |
| r9 | ∞ (aperture) | d9 13.546~7.343~2.200 | | |
| r10* | −28.125 | d10 2.800 | N5 1.84666 | v5 23.82 |
| r11* | −20.904 | d11 3.300 | | |
| r12 | −15.831 | d12 1.100 | N6 1.67000 | v6 57.07 |
| r13 | 397.919 | | | |

Aspherical Coefficients r1: $\epsilon = 0.10000 \times 10$  r8: $\epsilon = 0.10000 \times 10$
A4 = $-0.29744 \times 10^{-3}$   A4 = $0.15999 \times 10^{-4}$
A6 = $0.35745 \times 10^{-5}$    A6 = $-0.69678 \times 10^{-6}$
A8 = $-0.21492 \times 10^{-7}$   A8 = $0.22552 \times 10^{-7}$
A10 = $0.74218 \times 10^{-10}$  A10 = $-0.27314 \times 10^{-10}$
A12 = $-0.11266 \times 10^{-12}$ A12 = $-0.29684 \times 10^{-11}$
r2: $\epsilon = 0.10000 \times 10$  r10: $\epsilon = 0.10000 \times 10$
A4 = $-0.29995 \times 10^{-3}$   A4 = $0.11498 \times 10^{-3}$
A6 = $0.42036 \times 10^{-5}$    A6 = $-0.39348 \times 10^{-7}$
A8 = $-0.26961 \times 10^{-7}$   A8 = $0.55384 \times 10^{-7}$
A10 = $0.10283 \times 10^{-9}$   A10 = $-0.65697 \times 10^{-9}$
A12 = $-0.86537 \times 10^{-13}$ A12 = $0.18701 \times 10^{-11}$
r7: $\epsilon = 0.10000 \times 10$  r11: $\epsilon = 0.10000 \times 10$
A4 = $-0.35065 \times 10^{-4}$   A4 = $0.10556 \times 10^{-3}$
A6 = $-0.38185 \times 10^{-6}$   A6 = $0.60116 \times 10^{-6}$
A8 = $0.14771 \times 10^{-7}$    A8 = $0.81346 \times 10^{-8}$
A10 = $-0.65331 \times 10^{-11}$ A10 = $0.43543 \times 10^{-9}$
A12 = $-0.17435 \times 10^{-11}$ A12 = $-0.43959 \times 10^{-11}$ <Embodiment 4>
f = 39.0~75.5~146.0 FNO = 4.1~6.5~8.7

| Radius of Curvature | | Axial Distance | Refractive Index | Abbe Number |
|---|---|---|---|---|
| r1* | −596.402 | d1 1.900 | N1 1.75450 | v1 51.57 |
| r2* | 43.359 | d2 1.300 | | |
| r3 | 32.043 | d3 2.500 | N2 1.84666 | v2 23.82 |
| r4 | 42.354 | d4 19.842~9.842~2.742 | | |
| r5 | 22.532 | d5 2.000 | N3 1.83350 | v3 21.00 |
| r6 | 16.502 | d6 1.300 | | |
| r7* | 19.445 | d7 6.200 | N4 1.58170 | v4 69.75 |
| r8* | −32.954 | d8 1.368 | | |
| r9 | ∞ (aperture) | d9 22.298~10.009~2.950 | | |
| r10* | −41.355 | d10 3.700 | N5 1.84666 | v5 23.82 |
| r11* | −29.956 | d11 4.516 | | |
| r12 | −21.243 | d12 1.200 | N6 1.67000 | v6 57.07 |
| r13 | 572.380 | | | |

Aspherical Coefficients r1: $\epsilon = 0.10000 \times 10$  r8: $\epsilon = 0.10000 \times 10$
A4 = $-0.11458 \times 10^{-3}$   A4 = $0.65242 \times 10^{-5}$
A6 = $0.77869 \times 10^{-6}$    A6 = $-0.13435 \times 10^{-6}$
A8 = $-0.24837 \times 10^{-8}$   A8 = $0.24093 \times 10^{-8}$
A10 = $0.39898 \times 10^{-11}$  A10 = $-0.12262 \times 10^{-11}$
A12 = $-0.16873 \times 10^{-14}$ A12 = $-0.97728 \times 10^{-13}$
r2: $\epsilon = 0.10000 \times 10$  r10: $\epsilon = 0.10000 \times 10$
A4 = $-0.11439 \times 10^{-3}$   A4 = $0.48611 \times 10^{-4}$
A6 = $0.87737 \times 10^{-6}$    A6 = $-0.70017 \times 10^{-7}$
A8 = $-0.27552 \times 10^{-8}$   A8 = $0.67659 \times 10^{-8}$
A10 = $0.10207 \times 10^{-9}$   A10 = $-0.65625 \times 10^{-9}$
A12 = $0.41479 \times 10^{-14}$  A12 = $0.43193 \times 10^{-13}$
r7: $\epsilon = 0.10000 \times 10$  r11: $\epsilon = 0.10000 \times 10$
A4 = $-0.82547 \times 10^{-5}$   A4 = $0.40956 \times 10^{-4}$
A6 = $-0.50322 \times 10^{-7}$   A6 = $0.14044 \times 10^{-6}$
A8 = $0.16364 \times 10^{-8}$    A8 = $0.91751 \times 10^{-9}$ -continued <Embodiment 4>
f = 39.0~75.5~146.0 FNO = 4.1~6.5~8.7

| Radius of Curvature | Axial Distance | Refractive Index | Abbe Number |
|---|---|---|---|
| A10 = −0.20350 × 10⁻¹¹ | A10 = 0.28469 × 10⁻¹⁰ | | |
| A12 = −0.56611 × 10⁻¹³ | A12 = −0.93260 × 10⁻¹³ | | |

<Embodiment 5>
f = 28.5~54.0~102.4 FNO = 4.12~6.5~8.7

| Radius of Curvature | | Axial Distance | | Refractive Index | | Abbe Number | |
|---|---|---|---|---|---|---|---|
| r1* | −651.504 | d1 | 1.400 | N1 | 1.75450 | ν1 | 51.57 |
| r2* | 29.104 | d2 | 1.000 | | | | |
| r3 | 24.651 | d3 | 2.200 | N2 | 1.84666 | ν2 | 23.82 |
| r4 | 33.057 | d4 | 14.500~6.500~2.000 | | | | |
| r5 | ∞ (aperture) | d5 | 0.000 | N3 | 1.83350 | ν3 | 21.00 |
| r6 | 12.065 | d6 | 1.000 | | | | |
| r7 | 12.065 | d7 | 1.000 | | | | |
| r8* | 13.860 | d8 | 4.700 | N4 | 1.58170 | ν4 | 69.75 |
| r9* | −23.337 | d9 | 1.000 | | | | |
| r10 | ∞ | d10 | 15.150~7.389~2.200 | | | | |
| r11* | −21.086 | d11 | 2.800 | N5 | 1.84666 | ν5 | 23.82 |
| r12* | −21.090 | d12 | 3.300 | | | | |
| r13 | −15.360 | d13 | 1.100 | N6 | 1.67000 | ν6 | 57.07 |
| r14 | 1538.343 | | | | | | |

Aspherical Coefficients r1: ε = 0.10000 × 10
A4 = −0.28917 × 10⁻³
A6 = 0.35954 × 10⁻⁵
A8 = −0.21756 × 10⁻⁷
A10 = 0.71088 × 10⁻¹⁰
A12 = −0.96760 × 10⁻¹³
r2: ε = 0.10000 × 10
A4 = −0.29378 × 10⁻³
A6 = 0.42000 × 10⁻⁵
A8 = −0.26985 × 10⁻⁷
A10 = 0.10213 × 10⁻⁹
A12 = −0.12397 × 10⁻¹²
r7: ε = 0.10000 × 10
A4 = −0.26018 × 10⁻⁴
A6 = −0.29284 × 10⁻⁶
A8 = 0.15184 × 10⁻⁷
A10 = −0.53927 × 10⁻¹¹
A12 = −0.17460 × 10⁻¹¹ r9: ε = 0.10000 × 10
A4 = 0.16323 × 10⁻⁴
A6 = −0.60832 × 10⁻⁶
A8 = 0.22962 × 10⁻⁷
A10 = −0.26647 × 10⁻¹⁰
A12 = −0.29723 × 10⁻¹¹
r11: ε = 0.10000 × 10
A4 = 0.11824 × 10⁻³
A6 = −0.58639 × 10⁻⁷
A8 = 0.55455 × 10⁻⁷
A10 = −0.65618 × 10⁻⁹
A12 = 0.18768 × 10⁻¹¹
r12: ε = 0.10000 × 10
A4 = 0.10294 × 10⁻³
A6 = 0.59938 × 10⁻⁶
A8 = 0.82616 × 10⁻⁸
A10 = 0.43846 × 10⁻⁹
A12 = −0.43676 × 10⁻¹¹

TABLE 1

| Condition | Min. | Max. | Emb. 1 | Emb. 2 | Emb. 3 | Emb. 4 | Emb. 5 |
|---|---|---|---|---|---|---|---|
| (1) | 0.4 | 0.9 | 0.53 | 0.63 | 0.69 | 0.81 | 0.52 |
| (4) | 0.05 | 0.3 | 0.160 | 0.159 | 0.159 | 0.154 | 0.160 |
| (5) | 0.2 | 0.5 | 0.35 | 0.35 | 0.35 | 0.44 | 0.35 |
| (9) G1 | 0.05 | 1 | 0.12 | 0.12 | 0.12 | 0.14 | 0.12 |
| (9) G4 | 0.05 | 1 | 0.73 | 0.73 | 0.73 | 0.67 | 0.73 |
| (9) G5 | 0.05 | 1 | 0.32 | 0.33 | 0.32 | 0.36 | 0.32 |
| (10) | 0.5 | 3.0 | 1.13 | 1.13 | 1.13 | 1.20 | 1.13 |
| (11) | 0.1 | 1.1 | 0.96 | 0.94 | 0.88 | 0.88 | 0.97 |
| (12) | 2.0 | 6.3 | 4.31 | 4.86 | 5.42 | 6.26 | 4.31 |
| (13) | 5.0 | 12.0 | 7.68 | 8.50 | 9.11 | 9.73 | 5.32 |
| (14) | 3.2 | 7.3 | 5.15 | 5.57 | 5.83 | 6.65 | 5.16 |
| (15) | 0.4 | 0.6 | 0.48 | 0.523 | 0.558 | 0.434 | 0.48 |
| (16) | 0.08 | 0.17 | 0.12 | 0.15 | 0.17 | 0.11 | 0.12 |
| (17) | 4.0 | 8.5 | 5.9 | 6.67 | 7.38 | 7.94 | 5.9 |
| (18) | 4.0 | 6.5 | 5.9 | 6.67 | 7.38 | 7.94 | 5.9 |
| (19) | 3.0 | 5.0 | 3.89 | 3.83 | 3.60 | 4.04 | 3.93 |
| (20) | 0.45 | 0.8 | 0.55 | 0.60 | 0.63 | 0.52 | 0.56 |
| (21) | −3.0 | −5.0 | −4.11 | −3.78 | −3.57 | −4.45 | −4.09 |
| (22) | 1.5 | 2.5 | 1.79 | 1.79 | 1.76 | 2.01 | 1.79 |

TABLE 2

| | | 0.1 Ymax | 0.2 Ymax | 0.3 Ymax | 0.4 Ymax | 0.5 Ymax |
|---|---|---|---|---|---|---|
| Emb. 1 | r1 | — | — | — | — | 1.67 × 10⁻³ |
| | r2 | — | — | — | — | −1.26 × 10⁻³ |
| | r7 | −8.80 × 10⁻⁷ | −7.23 × 10⁻⁶ | −2.50 × 10⁻⁵ | −6.00 × 10⁻⁵ | −1.16 × 10⁻⁴ |
| | r8 | −4.66 × 10⁻⁷ | −3.43 × 10⁻⁶ | −2.26 × 10⁻⁵ | −5.81 × 10⁻⁴ | −1.26 × 10⁻³ |
| | r10 | — | — | — | — | −1.25 × 10⁻³ |
| | r11 | — | — | — | — | 1.18 × 10⁻³ |
| Emb. 2 | r1 | — | — | — | — | 1.70 × 10⁻³ |
| | r2 | — | — | — | — | −1.26 × 10⁻³ |
| | r7 | −8.71 × 10⁻⁷ | −7.03 × 10⁻⁶ | −2.43 × 10⁻⁵ | −5.84 × 10⁻⁵ | −1.13 × 10⁻⁴ |
| | r8 | −5.34 × 10⁻⁷ | −3.96 × 10⁻⁶ | −1.23 × 10⁻⁵ | −2.69 × 10⁻⁵ | −5.05 × 10⁻⁵ |
| | r10 | — | — | — | — | −1.27 × 10⁻³ |
| | R11 | — | — | — | — | 1.22 × 10⁻³ |
| Emb. 3 | r1 | — | — | — | — | 1.65 × 10⁻³ |
| | r2 | — | — | — | — | −1.26 × 10⁻³ |
| | r7 | −1.14 × 10⁻⁶ | −9.29 × 10⁻⁶ | −3.21 × 10⁻⁵ | −7.78 × 10⁻⁵ | −1.53 × 10⁻⁴ |
| | r8 | −4.86 × 10⁻⁷ | −3.60 × 10⁻⁶ | −1.07 × 10⁻⁵ | −2.20 × 10⁻⁵ | −3.84 × 10⁻⁵ |
| | r10 | — | — | — | — | −8.36 × 10⁻⁴ |

TABLE 2-continued

|  |  | 0.1 Ymax | 0.2 Ymax | 0.3 Ymax | 0.4 Ymax | 0.5 Ymax |
| --- | --- | --- | --- | --- | --- | --- |
|  | r11 | — | — | — | — | $1.05 \times 10^{-3}$ |
| Emb. 4 | r11 | — | — | — | — | $7.79 \times 10^{-4}$ |
|  | r2 | — | — | — | — | $-6.19 \times 10^{-4}$ |
|  | r7 | $-5.09 \times 10^{-7}$ | $-4.09 \times 10^{-6}$ | $-1.41 \times 10^{-5}$ | $-3.36 \times 19^{-5}$ | $-6.40 \times 10^{-5}$ |
|  | r8 | $-3.72 \times 10^{-7}$ | $-2.78 \times 10^{-6}$ | $-8.42 \times 10^{-6}$ | $-1.77 \times 10^{-5}$ | $-3.20 \times 10^{-5}$ |
|  | r10 | — | — | — | — | $-5.93 \times 10^{-4}$ |
|  | r11 | — | — | — | — | $5.40 \times 10^{-4}$ |
| Emb. 5 | r1 | — | — | — | — | $1.67 \times 10^{-3}$ |
|  | r2 | — | — | — | — | $-1.26 \times 10^{-3}$ |
|  | r8 | $-7.67 \times 10^{-7}$ | $-6.33 \times 10^{-6}$ | $-2.18 \times 10^{-5}$ | $-5.24 \times 10^{-5}$ | $-1.01 \times 10^{-4}$ |
|  | r9 | $-4.66 \times 10^{-7}$ | $-3.45 \times 10^{-6}$ | $-1.06 \times 10^{-5}$ | $-2.26 \times 10^{-5}$ | $-4.19 \times 10^{-5}$ |
|  | r11 | — | — | — | — | $-1.25 \times 10^{-3}$ |
|  | r12 | — | — | — | — | $1.17 \times 10^{-3}$ |

TABLE 3

|  |  | 0.6 Ymax | 0.7 Ymax | 0.8 Ymax | 0.9 Ymax | 1.0 Ymax |
| --- | --- | --- | --- | --- | --- | --- |
| Emb. 1 | r1 | $2.09 \times 10^{-6}$ | $2.24 \times 10^{-3}$ | $2.08 \times 10^{-3}$ | $1.62 \times 10^{-3}$ | $8.72 \times 10^{-4}$ |
|  | r2 | $-1.57 \times 10^{-3}$ | $-1.56 \times 10^{-3}$ | $-1.10 \times 10^{-3}$ | $1.01 \times 10^{-4}$ | $2.56 \times 10^{-3}$ |
|  | r7 | $-1.91 \times 10^{-4}$ | $-2.71 \times 10^{-4}$ | $-3.29 \times 107\,4$ | $-3.32 \times 10^{-4}$ | $-2.79 \times 10^{-4}$ |
|  | r8 | $-2.51 \times 10^{-3}$ | $-4.60 \times 10^{-3}$ | $-7.75 \times 10^{-3}$ | $-1.17 \times 10^{-2}$ | $-1.56 \times 10^{-2}$ |
|  | r10 | $-2.48 \times 10^{-3}$ | $-4.55 \times 10^{-3}$ | $-7.66 \times 10^{-3}$ | $-1.16 \times 10^{-2}$ | $-1.54 \times 10^{-2}$ |
|  | r11 | $2.39 \times 10^{-3}$ | $4.66 \times 10^{-3}$ | $8.70 \times 10^{-3}$ | $1.50 \times 10^{-3}$ | $2.22 \times 10^{-3}$ |
| Emb. 2 | r1 | $2.15 \times 10^{-3}$ | $2.32 \times 10^{-3}$ | $2.17 \times 10^{-3}$ | $1.68 \times 10^{-3}$ | $8.68 \times 10^{-4}$ |
|  | r2 | $-1.58 \times 10^{-3}$ | $-1.59 \times 10^{-3}$ | $-1.13 \times 10^{-3}$ | $1.35 \times 10^{-4}$ | $2.85 \times 10^{-5}$ |
|  | r7 | $-1.19 \times 10^{-4}$ | $-2.71 \times 10^{-4}$ | $-3.37 \times 10^{-4}$ | $-3.59 \times 10^{-4}$ | $-3.34 \times 10^{-4}$ |
|  | r8 | $-9.16 \times 10^{-5}$ | $-1.70 \times 10^{-4}$ | $-3.15 \times 10^{-4}$ | $-5.53 \times 10^{-4}$ | $-8.43 \times 10^{-4}$ |
|  | r10 | $-2.52 \times 10^{-3}$ | $-4.63 \times 10^{-3}$ | $-7.81 \times 10^{-3}$ | $-1.19 \times 10^{-2}$ | $-1.59 \times 10^{-2}$ |
|  | R11 | $2.47 \times 10^{-3}$ | $4.82 \times 10^{-3}$ | $8.98 \times 10^{-3}$ | $1.55 \times 10^{-2}$ | $2.31 \times 10^{-2}$ |
| Emb. 3 | r1 | $2.15 \times 10^{-3}$ | $2.42 \times 10^{-3}$ | $2.37 \times 10^{-3}$ | $1.96 \times 10^{-3}$ | $1.18 \times 10^{-3}$ |
|  | r2 | $-1.68 \times 10^{-3}$ | $-1.68 \times 10^{-3}$ | $-1.27 \times 10^{-3}$ | $-1.45 \times 10^{-5}$ | $2.87 \times 10^{-3}$ |
|  | r7 | $-2.60 \times 10^{-4}$ | $-3.90 \times 10^{-4}$ | $-5.25 \times 10^{-4}$ | $-6.49 \times 10^{-4}$ | $-7.83 \times 10^{-4}$ |
|  | r8 | $-6.65 \times 10^{-5}$ | $-1.23 \times 10^{-4}$ | $-2.34 \times 10^{-4}$ | $-4.14 \times 10^{-4}$ | $-5.91 \times 10^{-4}$ |
|  | r10 | $-1.65 \times 10^{-3}$ | $-3.04 \times 10^{-3}$ | $-5.14 \times 10^{-3}$ | $-7.89 \times 10^{-3}$ | $-1.07 \times 10^{-2}$ |
|  | r11 | $2.10 \times 10^{-3}$ | $4.02 \times 10^{-3}$ | $7.40 \times 10^{-2}$ | $1.28 \times 10^{-2}$ | $1.96 \times 10^{-2}$ |
| Emb. 4 | r1 | $1.08 \times 10^{-3}$ | $1.30 \times 10^{-3}$ | $1.40 \times 10^{-3}$ | $1.33 \times 10^{-3}$ | $1.05 \times 10^{-3}$ |
|  | r2 | $-8.47 \times 10^{-4}$ | $-9.95 \times 10^{-4}$ | $-9.89 \times 10^{-4}$ | $-7.45 \times 10^{-4}$ | $-1.02 \times 10^{-4}$ |
|  | r7 | $-1.02 \times 10^{-4}$ | $-1.38 \times 10^{-4}$ | $-1.56 \times 10^{-4}$ | $-1.53 \times 10^{-4}$ | $-1.80 \times 10^{-4}$ |
|  | r8 | $-5.72 \times 10^{-5}$ | $-1.07 \times 10^{-4}$ | $-2.00 \times 10^{-4}$ | $-3.37 \times 10^{-4}$ | $-4.34 \times 10^{-4}$ |
|  | r10 | $-1.14 \times 10^{-3}$ | $-2.09 \times 10^{-3}$ | $-3.65 \times 10^{-3}$ | $-6.07 \times 10^{-3}$ | $-9.53 \times 10^{-3}$ |
|  | r11 | $1.05 \times 10^{-3}$ | $1.96 \times 10^{-3}$ | $3.61 \times 10^{-3}$ | $6.58 \times 10^{-3}$ | $1.18 \times 10^{-2}$ |
| Emb. 5 | r1 | $2.09 \times 10^{-3}$ | $2.24 \times 10^{-3}$ | $2.08 \times 10^{-3}$ | $1.62 \times 10^{-3}$ | $8.37 \times 10^{-4}$ |
|  | r2 | $-1.56 \times 10^{-3}$ | $-1.56 \times 10^{-3}$ | $-1.09 \times 10^{-3}$ | $1.18 \times 10^{-3}$ | $2.60 \times 10^{-3}$ |
|  | r8 | $-1.67 \times 10^{-4}$ | $-2.37 \times 10^{-4}$ | $-2.88 \times 10^{-4}$ | $-2.91 \times 10^{-4}$ | $-2.46 \times 10^{-4}$ |
|  | r9 | $-7.61 \times 10^{-5}$ | $-1.44 \times 10^{-4}$ | $-2.74 \times 10^{-4}$ | $-4.91 \times 10^{-4}$ | $-7.58 \times 10^{-4}$ |
|  | r11 | $-2.48 \times 10^{-3}$ | $-4.55 \times 10^{-3}$ | $-7.66 \times 10^{-3}$ | $-1.16 \times 10^{-2}$ | $-1.54 \times 10^{-2}$ |
|  | r12 | $2.39 \times 10^{-3}$ | $4.66 \times 10^{-3}$ | $8.69 \times 10^{-3}$ | $1.50 \times 10^{-2}$ | $2.22 \times 10^{-2}$ |

What is claimed is:

1. A zoom lens system comprising from the object side to the image side:

a negative first lens unit consisting of from the object side to the image side a negative lens element and a positive lens element;

a positive second lens unit consisting of a negative lens element and a positive lens element, and having a first air space between the first and second lens units; and a negative third lens unit consisting of from the object side to the image side a positive lens element and a negative lens element, and having a second air space between the second and third lens units;

wherein all the lens units shift along an optical axis of the zoom lens system during a zooming operation from the shortest focal length condition to the longest focal length condition while decreasing the first and second air spaces.

2. A zoom lens system as claimed in claim 1, wherein the positive second lens unit consists of from the object side to the image side the negative meniscus lens element and the positive biconvex lens element.

3. A zoom lens system as claimed in claim 1 wherein an aspherical surface is provided in a lens element of one of the lens units.

4. A zoom lens system as claimed in claim 3 wherein the aspherical surface is provided in the first lens element.

5. A zoom lens system as claimed in claim 3 wherein the aspherical surface is provided in the second lens unit.

6. A zoom lens system as claimed in claim 3 wherein the aspherical surface is provided in the third lens unit.

7. A zoom lens system as claimed in claim 6 wherein the aspherical surface satisfies at least one of the following two conditions:

$$-0.05 < \phi_3 \cdot (N'-N) \cdot (d/dY) \cdot \{X(Y) - X_0(Y)\} < .01$$

$$.01 < \phi_3 \cdot (N'-N) \cdot (d/dY) \cdot \{X(Y) - X_0(Y)\} < .05$$

wherein $\phi_3$ is the refractive power of the third lens unit,

N is the index of refraction of the object-side medium of the aspherical surface, N' is the index of refraction of the image-side medium of the aspherical surface, X(Y) is the configuration of the aspherical surface, and $X_0(Y)$ is the configuration of the reference sphere for the aspherical surface.

8. A zoom lens system as claimed in claim 4 wherein the aspherical surface satisfies at least one of the following two conditions:

$$-.01 < \phi_1 \cdot (N'-N) \cdot (d/dY) \cdot \{X(Y) - X_0(Y)\} < .01$$

$$-.05 < \phi_1 \cdot (N'-N) \cdot (d/dY) \cdot \{X(Y) - X_0(Y)\} .01$$

wherein $\phi_1$ is the refractive power of the first lens unit,

N is the index of refraction of the object-side medium of the aspherical surface, N' is the index of refraction of the image-side medium of the aspherical surface, X(Y) is the configuration of the aspherical surface, and $X_0(Y)$ is the configuration of the reference sphere for the aspherical surface.

9. A zoom lens system as claimed in claim 5 wherein the aspherical surface satisfies the following condition:

$$-.01 < \phi_2 \cdot (N'-N) \cdot (d/dY) \cdot \{X(Y) - X_0(Y)\} < .005$$

wherein $\phi_2$ is the refractive power of the second lens unit,

N is the index of refraction of the object-side medium of the aspherical surface, N' is the index of refraction of the image-side medium of the aspherical surface, X(Y) is the configuration of the aspherical surface, and $X_0(Y)$ is the configuration of the reference sphere for the aspherical surface.

10. A zoom lens system comprising from the object side to the image side:

a negative first lens unit comprising at least one negative lens element and at least one positive lens element;

a positive second lens unit comprising at least one negative lens element and at least one positive lens element, having at least one aspherical surface, and having a first air space between the first and second lens units; and a negative third lens unit comprising at least one negative lens element and at least one positive lens element, and having a second air space between the second and third lens units;

wherein all the lens units shift along an optical axis of the zoom lens system during an zooming operation from the shortest focal length condition to the longest focal length condition with decreasing the first and second air spaces, and the zoom lens system fulfills the following condition:

$$.1 < (E_{1-2W} - E_{1-2T})/(E_{2-3W} - E_{2-3T}) < .1$$

wherein;

$E_{1-2W}$ represents a distance between principal points of the negative first and positive second lens units at the shortest focal length condition;

$E_{1-2T}$ represents a distance between principal points of the negative first and positive second lens units at the longest focal length condition;

$E_{2-3W}$ represents a distance between principal points of the positive second and negative third lens units at the shortest focal length condition; and $E_{2-3T}$ represents a distance between principal points of the positive second and negative third lens units at the longest focal length condition.

11. A zoom lens system as claimed in claim 10, wherein all the lens units consist of two lens elements.

12. A zoom lens system comprising from the object side to the image side:

a negative first lens unit;

a positive second lens unit comprising at least one negative lens element and at least one positive lens element, having at least one aspherical surface, and having a first air space between the first and second lens units; and a negative third lens unit having a second air space between the second and third lens units;

wherein all the lens units shift along an optical axis of the zoom lens system during a zooming operation from the shortest focal length condition to the longest focal length condition with decreasing the first and second air spaces, and the zoom lens system fulfills the following conditions:

$$.4 < (\beta_{2T} \cdot \beta_{3W})/(\beta_{2W} \cdot \beta_{3T}) < .6 \quad 4.0 < f_2 \cdot (f_W/f_T) < .5$$

wherein;

$\beta_{2T}$ represents a paraxial lateral magnification of the positive second lens unit at the longest focal length condition;

$\beta_{2W}$ represents a paraxial lateral magnification of the positive second lens unit at the shortest focal length condition;

$\beta_{3T}$ represents a paraxial lateral magnification of the negative third lens unit at the longest focal length condition;

$\beta_{3W}$ represents a paraxial lateral magnification of the negative third lens unit at the shortest focal length condition;

$f_2$ represents a focal length of the positive second lens unit;

$f_T$ represents a focal length of the entire zoom lens system at the longest focal length condition; and $f_W$ represents a focal length of the entire zoom lens system at the shortest focal length condition.

13. A zoom lens system comprising from the object side to the image side:

a negative first lens unit;

a positive second lens unit comprising at least one negative lens element and at least one positive lens element, having at least one aspherical surface, and having a first air space between the first and second lens units; and a negative third lens unit having a second air space between the second and third lens units;

wherein all the lens units shift along an optical axis of the zoom lens system during a zooming operation from the shortest focal length condition to the longest focal length condition with decreasing the first and second air spaces, and the zoom lens system fulfills the following conditions:

$$.0 < T_{1-3W} \cdot (f_W/f_T) < 12.0$$

wherein;

$T_{1-sw}$ represents a distance between the most object side surface of the zoom lens system and an aperture stop at the shortest focal length condition;

$f_T$ represents a focal length of the entire zoom lens system at the longest focal length condition; and $f_W$ represents a focal length of the entire zoom lens system at the shortest focal length condition.

14. A zoom lens system comprising, from the object side to the image side:

a negative first lens unit consisting of, from the object side to the image side, a negative lens element and a positive lens element, the lens elements being spaced to provide an air lens between an image side surface of the negative lens element and an object side surface of the positive lens element;

a positive second lens unit consisting of a negative lens element and a positive lens element, and having a first air space between the first and second lens units; and a negative third lens unit consisting of, from the object side to the image side, a positive lens element and a negative lens element, and having a second air space between the second and third lens units;

wherein all the lens units shift along an optical axis of the zoom lens system during a zooming operation from the shortest focal length condition to the longest focal length condition while decreasing the first and second air spaces.

15. A zoom lens system as claimed in claim 14 wherein an aspherical surface is provided in a lens element of one of the lens units.

16. A zoom lens system as claimed in claim 14 wherein the air lens satisfies the following condition:

$$.4 < |\phi_A/\phi_1| < 0.9$$

wherein $\phi_A$ is a refractive power of the air lens formed by the image side surface of the negative lens and the object side surface of the positive lens, and $\phi_1$ is a refractive power of the first lens unit.

* * * * *